(12) United States Patent
Tamura et al.

(10) Patent No.: US 7,022,938 B2
(45) Date of Patent: Apr. 4, 2006

(54) REPAIR METHOD FOR STRUCTURE AND REPAIR WELDING APPARATUS

(75) Inventors: Masataka Tamura, Kanagawa-ken (JP); Yoshinobu Makino, Tokyo (JP); Wataru Kono, Tokyo (JP); Seiichiro Kimura, Tokyo (JP); Nobuichi Suezono, Kanagawa-ken (JP); Hidenori Takahashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 10/214,456

(22) Filed: Aug. 8, 2002

(65) Prior Publication Data

US 2003/0029845 A1 Feb. 13, 2003

(30) Foreign Application Priority Data

Aug. 9, 2001 (JP) .................................... 2001-241725

(51) Int. Cl.
 *B23K 31/00* (2006.01)

(52) U.S. Cl. .............................. 219/121.64; 219/121.85

(58) Field of Classification Search ............ 219/121.6, 219/121.63, 121.64, 121.85; 228/119, 165

See application file for complete search history.

(56) References Cited

U.S. PATENT DOCUMENTS

| | | | |
|---|---|---|---|
| 4,967,458 A | * | 11/1990 | Rosenberg et al. .... 29/888.011 |
| 5,443,201 A | | 8/1995 | Cartry |
| 5,667,706 A | | 9/1997 | Pirl et al. |
| 5,674,419 A | | 10/1997 | Koide et al. |
| 5,735,044 A | * | 4/1998 | Ferrigno et al. ........... 29/889.1 |
| 5,846,057 A | | 12/1998 | Ferrigno et al. |
| 6,211,482 B1 | | 4/2001 | Findlan et al. |
| 6,238,187 B1 | * | 5/2001 | Dulaney et al. ........ 416/241 R |
| 6,338,765 B1 | * | 1/2002 | Statnikov ..................... 148/558 |

FOREIGN PATENT DOCUMENTS

| | | |
|---|---|---|
| EP | 0 570 152 A2 | 11/1993 |
| EP | 0 993 898 A1 | 4/2000 |
| EP | 1 075 891 A2 | 2/2001 |
| JP | 7-62893 | 3/1995 |
| JP | 7-75893 | 3/1995 |

OTHER PUBLICATIONS

Patent Abstracts of Japan, vol. 008, No. 009 (M–268), Jan. 14, 1984 & JP 58–173095 A, Oct. 11, 1983.
Patent Abstracts of Japan, vol. 011, No. 393 (M–654), Dec. 23, 1987 & JP 62–1611493 A, Jul. 17, 1987.
Patent Abstracts of Japan, vol. 1996, No. 11, Nov. 29, 1996 & JP 08–192286 A, Jul. 30, 1996.

* cited by examiner

*Primary Examiner*—Samuel M. Heinrich
(74) *Attorney, Agent, or Firm*—Foely & Lardner LLP

(57) ABSTRACT

A repair method for a structure having an open flaw in a welding heat affected portion, including, removing at least a part of the open flaw and thereby forming a concave portion in the welding heat affected portion, forming build-up weld layers so as to fill the concave portion, treating a surface of the build-up layers to reduce tensile residual stress by means of at least one of laser peening, shot blasting and water jet machining. Also disclosed is an apparatus suitable for carrying out the repair method.

15 Claims, 5 Drawing Sheets

REPAIR METHOD FOR STRUCTURE AND REPAIR WELDING APPARATUS

CROSS-REFERENCE TO RELATED APPLICATIONS

This application is based upon and claims the benefit of priority from the prior Japanese Patent Application No. 2001-241725 filed on Aug. 9, 2001, the entire contents of which are incorporated herein by reference.

BACKGROUND OF THE INVENTION

1. Field of the Invention

This invention relates to a repair method and a repair welding apparatus for a structure, adapted to prevent an accident due to cracking of a structure and prolong a lifetime of a structure, and more particularly to a structure repair method and a repair welding apparatus, adapted to be applied to a structure in which stress corrosion cracking or fatigue cracking occurs.

2. Description of the Related Art

When a crack occurs in a structure, a machine and the like (which will hereinafter be referred to as a structure), for example, in a nuclear reactor, the structure may be exchanged as a whole, or repaired by attaching a reinforcing metal material to the cracked portion. Methods for repairing cracks mainly involve TIG (Tungsten Inert Gas) welding. However, TIG welding repair may be unsuitable for structure exposed to neutrons during long-term operation within a nuclear reactor. Neutron exposure may cause deterioration of the base material of a structure. If TIG welding is applied to such a base material deteriorated due to neutron irradiation, the amount of inputted heat may cause weld flaws.

Since the TIG welding involves melting a base material with an electric arc generated between the base material and a torch electrode, the arc becomes unstable when an oxide film is present on the base material. The TIG weld arc may also become unstable when an oxide film is deposited on or water enters an inner portion of an open flaw (i.e., crack). For this reason, stable welding operations cannot be performed when the base metal or the flaw to be repaired have an oxide layer or inner water.

In view of this, repair methods using laser beams have been developed in recent years. For example, Japanese Patent Publication (Laid-Open) No. 7-62893 discloses a repair method in which cutting and building-up are combined so as to deal with a flaw which causes, or has a possibility, to decrease the strength of a structure. According to this repair method, a crack removed by such repair work leaves behind a tensile residual stress on the surface of the repair weld zone due to the repair build-up welding. Therefore, there is the possibility of a crack recurring.

Japanese Patent Publication (Laid-Open) No. 7-75893 discloses a repair method for a structure, including a first step of removing a flaw-carrying region from the structure, thereby forming a recess in this portion, and filling the recess with a material, which contains at least one of the elements contained in a material constituting the structure, by build-up welding, and a second step for projecting energy into a surface portion of the above-mentioned region, thereby re-melting the surface portion of the region, followed by cooling the same surface portion at a rate at which resinous crystals of a size of between 0.1 µm and 3.0 µm are formed. This repair method attempts to desensitize a sensitized region occurring on the surface of a repaired weld zone by re-melting the surface portion of the repaired weld zone. However, the occurrence of tensile residual stress cannot be avoided due to shrinkage of the repaired weld zone during the repair welding and re-melting operations. Thus, this repair method does not eliminate the possibility that cracking will recur.

In the above-mentioned conventional repair methods, the occurrence of tensile residual stress in a repaired weld zone is unavoidable. Consequently, there is the possibility of cracks recurring, such as stress corrosion cracking, after the execution of a repair welding operation.

SUMMARY OF THE INVENTION

Accordingly, an object of the present invention is to provide a structure repair method and a repair welding apparatus, to remove a crack occurring in a structure or to seal an open portion of the surface of a crack, so as to inhibit recurrence of a crack by reducing tensile residual stress in the surface portion of the repair weld portion.

According to one aspect of the present invention, there is provided a repair method for a structure having an open flaw in a welding heat affected portion, including, removing at least a part of the open flaw and thereby forming a concave portion in the welding heat affected portion, forming build-up weld layers so as to fill the concave portion, and treating a surface of the build-up layers to reduce tensile residual stress by means of at least one of laser peening, shot blasting and water jet machining. For instance, this repair method may be successfully conducted underwater and on neutron-irradiated materials.

According to another aspect of the present invention, there is provided a repair method for a structure having an open flaw in a welding heat affected portion, including, cleaning a surface of the welding heat affected portion, forming build-up weld layers on a region including the open flaw to seal the open flaw therewith, and treating a surface of the build-up layers to reduce tensile residual stress by means of at least one of laser peening, shot blasting and water jet machining. For instance, this repair method may be successfully conducted underwater and on neutron-irradiated materials.

According to still another aspect of the present invention, there is provided a repair welding apparatus including, a laser oscillator, and a processing head optically connected to the laser oscillator and movably configured to be arranged on a surface of a structure member, the processing head including, a nozzle which forms an outlet for a shield gas, a laser beam supplied from the laser oscillator and a welding wire, an ultrasonic vibrating element arranged adjacent to the nozzle, and an optical system adapted to focus a laser beam supplied from the laser oscillator and apply a resultant laser beam through the outlet in the nozzle to a portion to be welded on the surface of the structure member. For instance, this apparatus is capable of repair welding operations underwater and on neutron-irradiated materials.

BRIEF DESCRIPTION OF THE DRAWINGS

Various embodiments of the present invention are illustrated in the accompanying drawings in which.

DETAILED DESCRIPTION OF THE INVENTION

Figure 1:
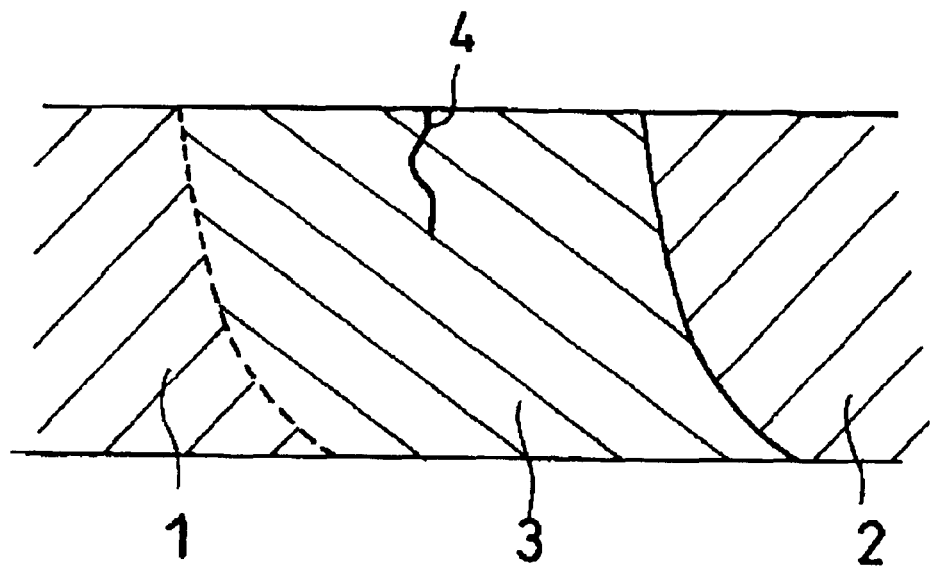
FIG. 1 is a sectional view showing a principal portion of a structure to be repaired by the repair method according to the present invention.

Referring now to the drawings, wherein like reference numerals designate identical or corresponding parts throughout the several views, various embodiments of this invention will be described below.

First Embodiment

A structure, an object to be repaired is, for example, as shown in FIG. 1. Namely, the structure member 1 is formed of a Fe alloy (iron alloy), such as austenite-based stainless steel, or a Ni alloy (nickel alloy), such as Inconel. When the structure member 1 is welded at a welding portion 2, a welding heat-affected portion 3 is generated. In the welding heat-affected portion 3, Cr carbide (chromium carbide) is deposited on grain boundaries of the material. When this condition occurs, the welding heat-affected portion 3 is said to be sensitized. Thus, there is the possibility that a crack-like open flaw 4 exists or may occur in the welding heat-affected portion 3.

Figure 2:
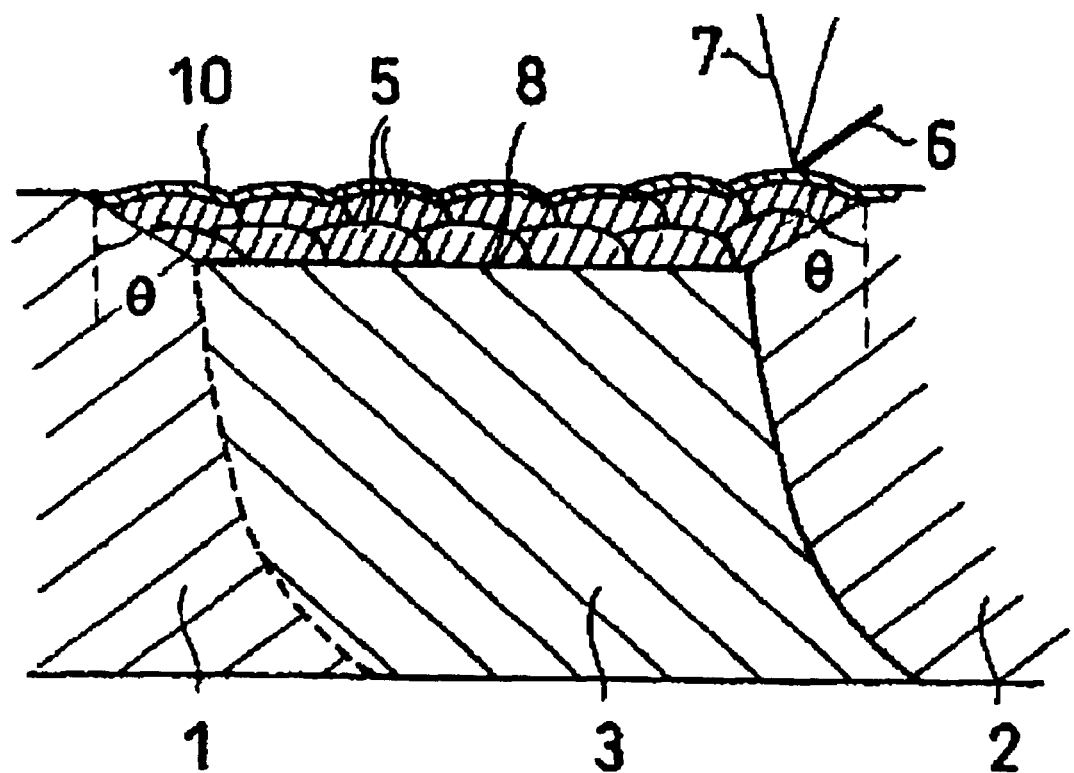
FIG. 2 is a drawing showing a cross section of a principal portion of the structure repaired by the repair method of a first embodiment of the present invention.

A repair method including two steps, i.e. a build-up welding step and a step of reducing tensile residual stress, will be described as a first embodiment of the present invention with reference to FIG. 2. First, as a pretreatment process, crud, that is a metal oxide of a radioactive corrosion product, or an oxide film deposited on a surface of the welding heat-affected portion 3 is removed. The cleaning of a surface portion of the welding heat-affected portion 3 is then carried out. During this cleaning operation, the irradiation of a laser beam, or mechanical grinding using a grinder or a flap wheel, is used. When the irradiation of a laser beam is used, the surface portion of the welding heat-affected portion 3 is momentarily heated by pulsing the laser with a pulse width not more than 100 nanoseconds, preferably from 5 to 100 nanoseconds. Such pulsed irradiation causes the crud or oxide film to be removed from the welding heat-affected portion 3.

After the surface portion of the welding heat-affected portion 3 has been cleaned, a visual external inspection and/or a nondestructive examination by ultrasonic waves are performed to check the surface portion for crack-like open flaws 4 therein, and where an open flaw 4 exists, the position and the width of the opening are determined.

When such an open flaw 4 exists, a part of the welding heat-affected portion 3 including at least a part of the open flaw 4 is removed during a first half of the first step, and a concave portion 8 is thereby formed. In this embodiment, the mechanical grinding process using a grinder or a flap wheel and the like, or electric discharge machining is employed.

The concave portion 8 is formed into a trapezoidal shape, with an angle θ of inclination of the slope preferably between 60° and 85°. The angle θ of inclination is set to this range in order to avoid interference by a nozzle at a front end of the processing head used for a repair welding operation, described later, with the concave portion 8. When the angle θ of inclination is set to between 60° and 85°, more preferably between 60° and 82°, a nozzle, which is between 7 and 30 millimeters in outer diameter, can be applied to the concave portion 8. In addition, the open flaw 4 may partly remain.

Next, in a latter half of the first step, this concave portion 8 is filled with build-up weld layers 5 by repair welding operations. Though the formation of the build-up weld layers 5 is realized by arc welding with the above-mentioned TIG welding method as a welding wire is supplied, this embodiment refers to more preferable way of the building up. That is, the build-up weld layers 5 are formed by irradiating the concave portion 8 with a laser beam 7 while simultaneously supplying a welding wire 6 and a shielding gas, such as by a repair welding apparatus which will be described later. For example, such a repair welding operation may be carried out by using a YAG (yttrium, aluminum, garnet) laser oscillator at 1.06 μm in wavelength with a 0.5 kW to 4.0 kW output, traversing at 0.1 m/min to 5 m/min, receiving 0.4 mm to 1.0 mm diameter welding wire supplied at a rate of 0.5 m/min to 8 m/min. Welding under these condition will deposit, for example, 0.1 J/cm to 5 kJ/cm.

When this repair method is applied to a structure in a nuclear reactor, there is a possibility that the base material may be deteriorated due to neutron irradiation. Neutron-irradiated base material may suffer weld flaws due to the heat input during a repair welding operation. Therefore, when this repair method is applied to a structure which has been deteriorated by neutron irradiation, the heat input during the repair welding operation is preferably reduced to between 0.1 kJ/cm and 5 kJ/cm.

As second step in this method, a residual stress-reduced layer 10 is formed by reducing the residual stress in a surface portion of the build-up weld layers 5 by means of laser peening or shot blasting. In the laser peening operation, the surface portions of the build-up weld layers 5 are heated momentarily, i.e., for periods of time of 5 to 100 nanoseconds, by the irradiation of a laser beam, thereby plastically deforming the surface portions. Thus, the tensile residual stress in the surface portions of the buildup weld layers 5 is reduced. In the shot blasting operation, the plastic deformation of the surface portions is induced by shooting steel balls of 0.1 to 5 millimeters in diameter at the surface portion including the build-up weld layers 5. The induced plastic deformation reduces the tensile residual stress in the surface portions of the build-up weld layers 5. Instead of, or in addition to the laser peening or the shot blasting, it is also possible to reduce the tensile residual stress by means of water jet machining for spraying high-speed water to the surface portion.

Repair welding process and residual stress reducing process described above will prevent cracking from occurring, and prevent recurring cracking, such as stress corrosion cracking, even in deteriorated structure, and thereby prolong the lifetime of the repaired weld portion, and thus the structure as a whole.

Figure 3:
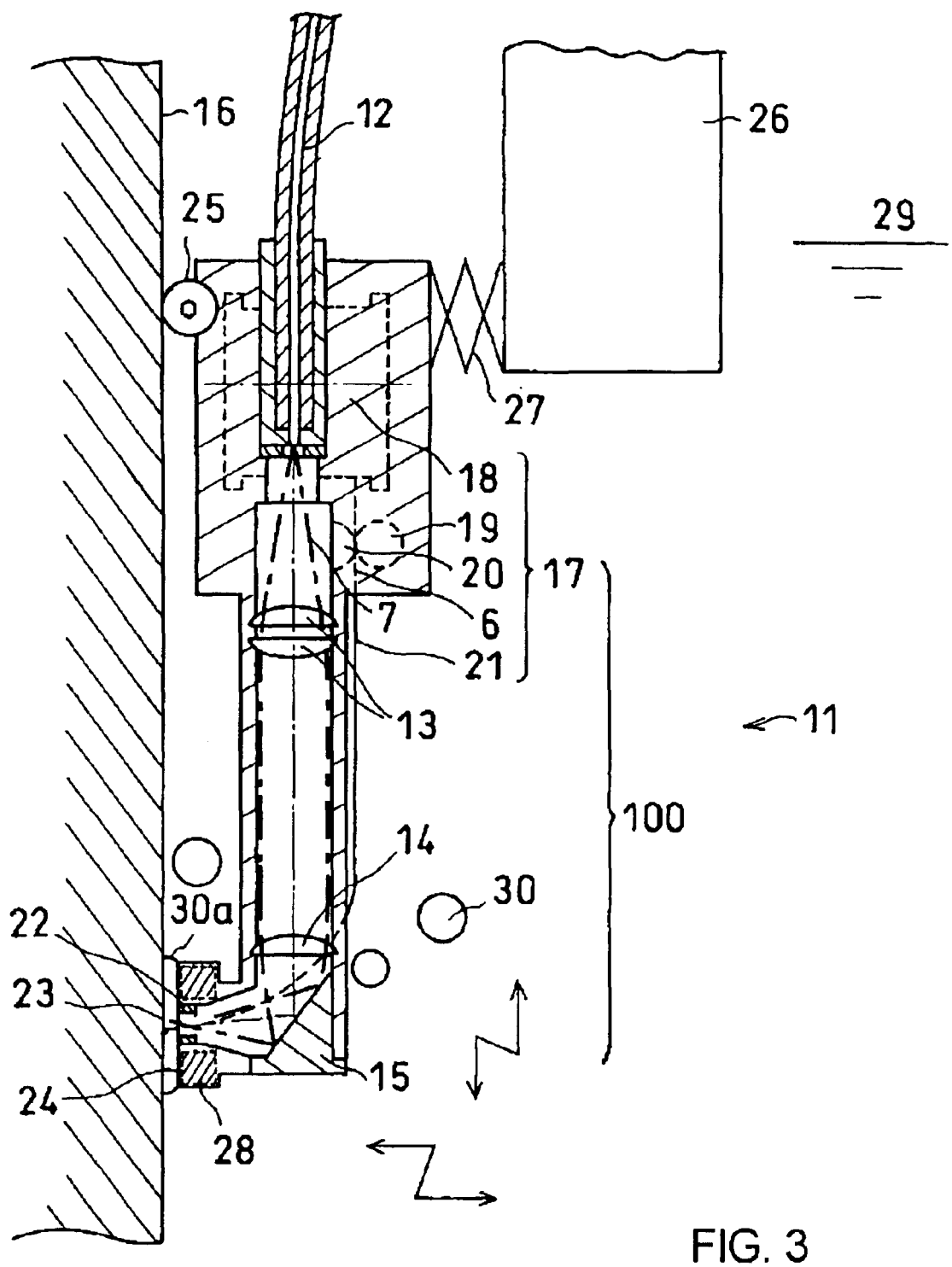
FIG. 3 is a sectional view showing a processing head of the repair welding apparatus of the mode of embodiment of the present invention.

The repair welding apparatus for carrying out the above-described repairing of a structure is shown in FIG. 3. The processing head 11 contains an integrated combination of an optical fiber 12, an optical system 100, and a wire supply unit 17 for supplying a welding wire 6 in the interior of the processing head 11. The optical system 100 of the processing head 11 is composed of a plurality of collimator lenses 13, a condenser 14, and a reflecting mirror 15.

The optical system 100 is adapted to turn a laser beam 7 emanating from the optical fiber 12 into parallel rays of light by the plurality of collimator lenses 13, and then focus the resultant light by condenser 14 in the vicinity of repair weld portion 23. The focused light is redirected by the reflecting mirror 15 to irradiate a laser beam 7 onto a surface of structure 16. The laser beam 7 is applied to the structure 16 not perpendicularly thereto, but at an angle of inclination of 10° to 20° so as to avoid reflecting light back into the interior of the processing head 11.

The wire supply unit 17 for supplying the welding wire 6 includes a wire reel 18 for the welding wire 6, a pressure roller 19, a servomotor 20, a wire supply pipe 21 and a wire tip 22. The welding wire 6 is sent out to the wire supply pipe 21 by the pressure roller 19 driven by the servomotor 20, and the welding wire 6 is supplied from the wire tip 22 to the repair weld portion 23. An ultrasonic motor may be used instead of a servomotor 20. Using an ultrasonic motor allows the weight of the processing head 11 to be reduced.

The welding wire 6 can be supplied smoothly because the wire supply unit 17 and the repair weld portion 23 are close to each other. Since the wire supply pipe 21 and wire tip 22 are combined together in one body by soldering and the wire tip 22 is placed in the interior of the nozzle 24, the welding wire 6 can be supplied in a dry state without wetting the portion 23 to be repair welded.

At the rear side of the processing head 11, a roller 25 is provided, and the processing head 11 and a processing machine 26 are connected together via a spring mechanism 27. For example, when the structure 16 has large projections and recesses, the spring mechanism 27 expands and contracts in accordance with the projections and recesses on and in the surface of the structure 16. The roller 25 contacts the surface of the structure 16, and the processing head 11 moves longitudinally as a whole. This mechanism maintains a constant nozzle gap, i.e., a distance between an end surface of the nozzle 24 and the structure 16. The nozzle gap influences the gaseous environment 30a formed by a shielding gas and the formation of weld beads. Therefore, since the nozzle gap can be kept constant, a stable underwater laser repair welding operation can be carried out.

Figure 4:
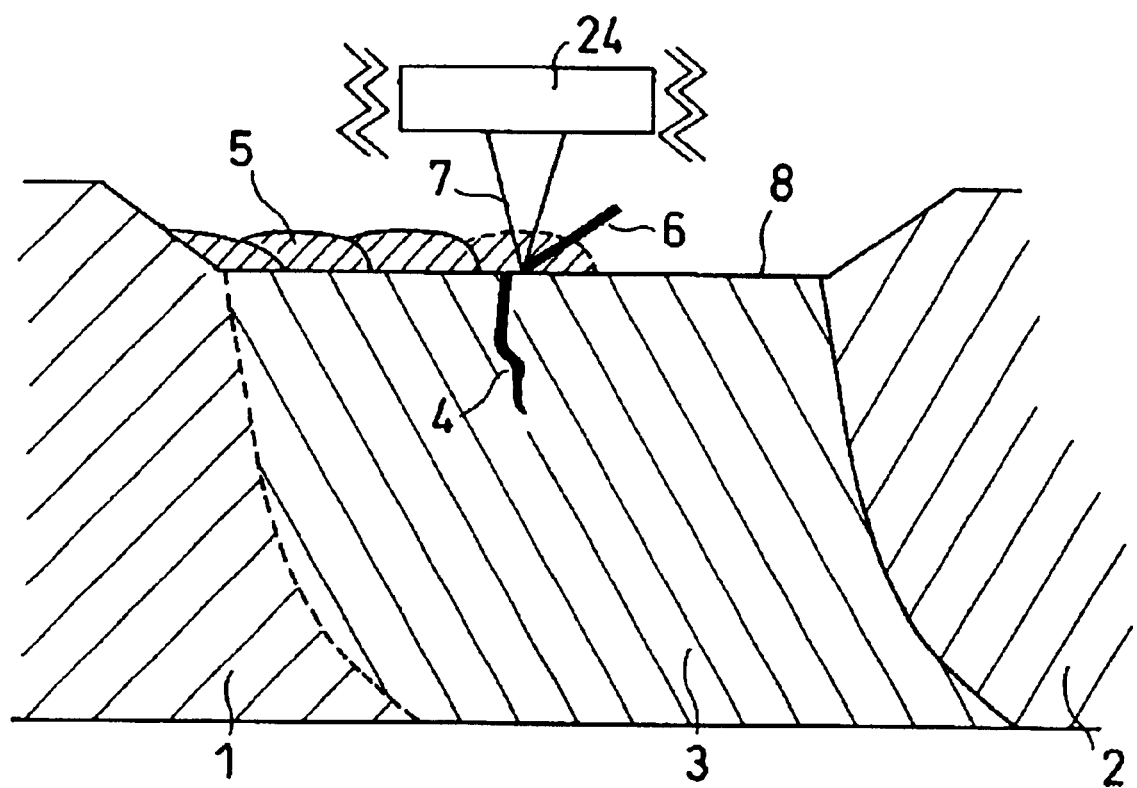
FIG. 4 is a sectional view showing an operation of the repair welding apparatus of a first embodiment of the present invention.

An ultrasonic vibrating element 28 is maybe fixed to a front end of the nozzle 24. This ultrasonic vibrating element 28 is adapted to ultrasonically vibrate the nozzle 24. This operation will be described with reference to FIG. 4. When an open flaw 4 resides partly in the concave portion 8 formed in an upper portion of the structure member 1, only a portion only of the open flaw 4 is sealed with an initial layer out of the build-up weld layers 5. As a result, it is possible for water to be inside of the open flaw ultrasonically vibrating the nozzle causes such water to me atomized and discharged from the open flaw 4.

Figures 5A, 5B:
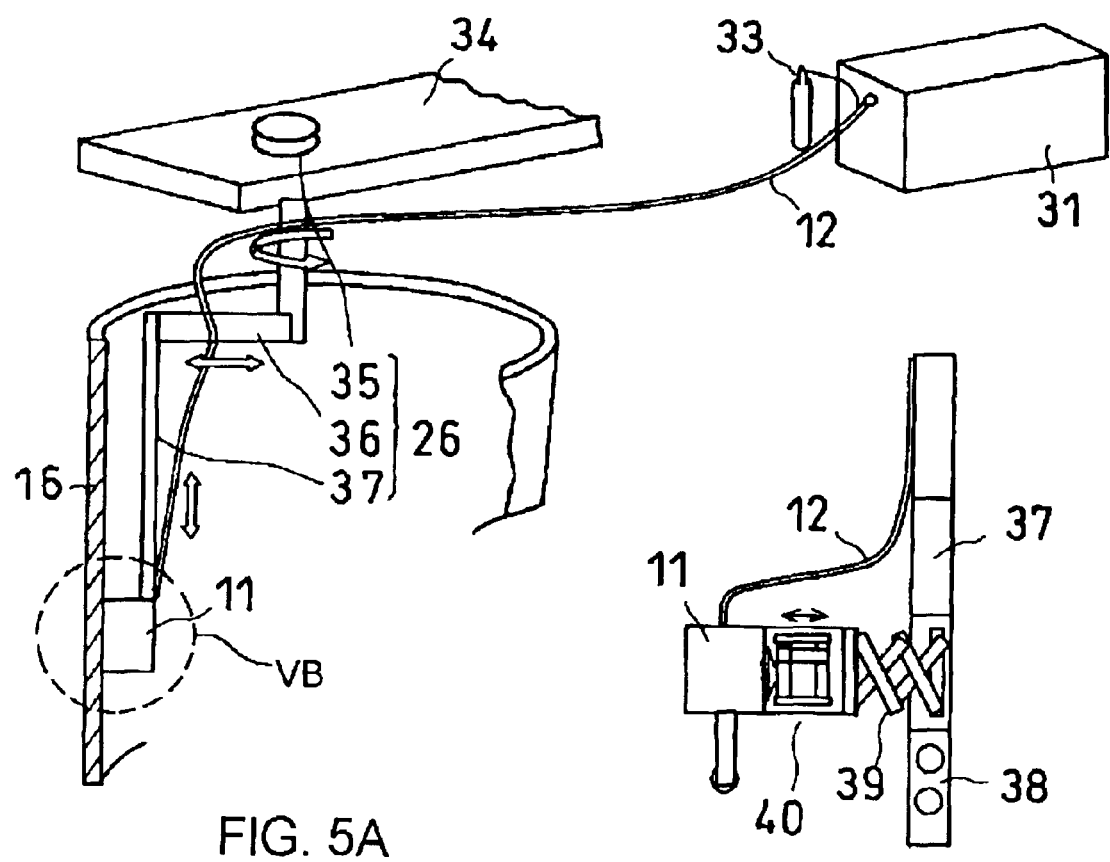
FIG. 5A is a perspective view showing the repair welding apparatus used in a first embodiment of the present invention.
FIG. 5B is a detailed sectional view showing a portion VB of FIG. 5A.

FIGS. 5A and 5B show general construction of a repair welding apparatus of this embodiment of the present invention. This repair welding apparatus is equipped with a laser oscillator 31, a processing machine 26 and a processing head 11.

The laser oscillator 31 is arranged with an Ar (argon) gas cylinder 33 in the atmosphere outside of the structure 16. In order to transmit a laser beam 7 discharged from the laser oscillator 31 to the processing head 11, the laser oscillator 31 is connected to the processing head 11 by an optical fiber 12. The Argon shielding gas is sent to the processing head 11 by means of a protective cover over the optical fiber 12. This construction makes it unnecessary to additionally arrange a tube for the shielding gas.

The processing machine 26 is equipped with a rotary unit 35, a central shaft of which is fixed to a beam 34 provided on an upper portion of a cylindrical structure 16. The processing machine 26 further includes a first slider 36 radially movable from the central shaft of the rotary unit 35, and a second slider 37 vertically movable from a front end of the first slider 36. The processing head 11 is fixed to a front end of the second slider 37, which permits the processing head 11 to be roughly positioned with respect to the repair weld portion 23. The second slider 37 is fixed at a front end portion thereof to the structure 16 with an adsorption pad 38. Final positioning of the processing head 11 is performed by a manipulator 39. Repair welding operation is carried out as the processing head 11 is moved by a two-shaft slider 40.

Second Embodiment

Figure 6:
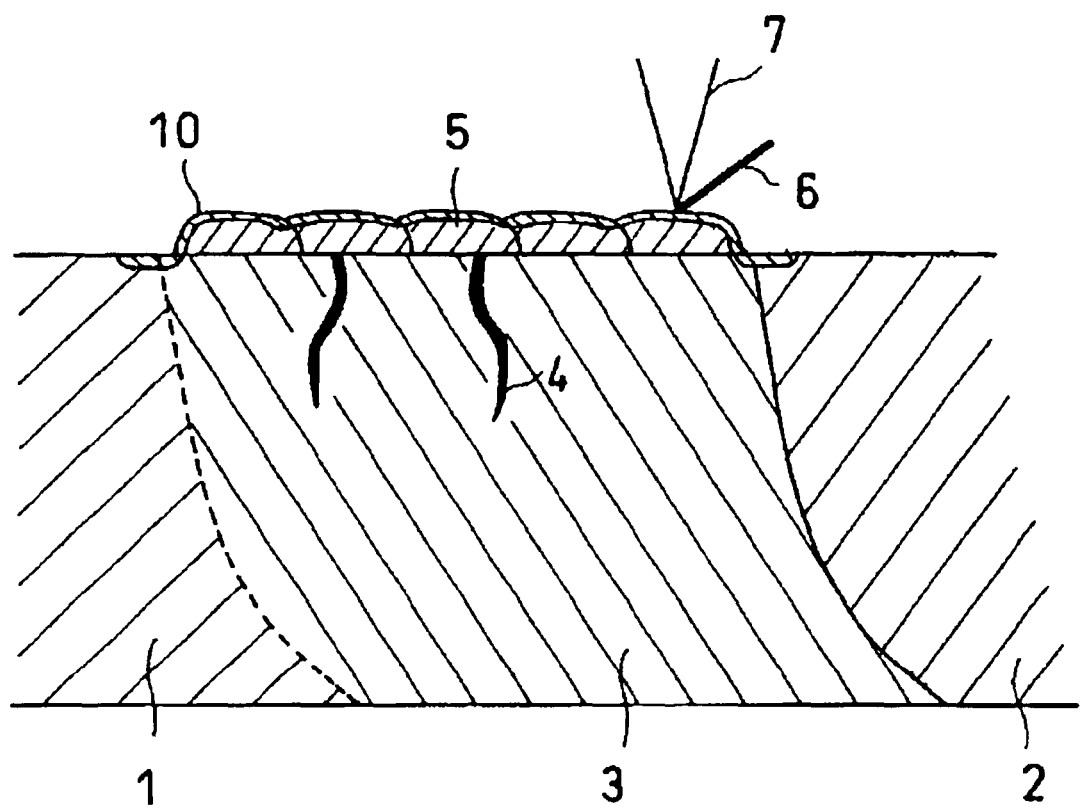
FIG. 6 is a sectional view of a principal portion of a structure, showing the repair method of a second embodiment of the present invention.

A repair method including two steps, i.e. a build-up welding step and a step of reducing tensile residual stress, carried out without removing an open flaw, will be described as a second embodiment of the present invention with reference to FIG. 6.

First, as a pretreatment step, crud or an oxide film sticking to a surface of a welding heat-affected portion 3 is removed, and the surface portion of the welding heat-affected portion 3 is cleaned. This cleaning operation is accomplished by irradiation of a laser beam or mechanical grinding, such as using a grinder or a flap wheel. When irradiation of a laser beam is used, only the surface portion of the welding heat-affected portion 3 is momentarily heated by pulsing the laser with a pulse width of the laser beam between 5 and 100 nanoseconds. This enables the crud or the oxide film to be removed from the surface.

After the surface portion of the welding heat-affected portion 3 is cleaned, a visual external inspection and/or a nondestructive examination by ultrasonic waves are performed to check the surface portion for crack-like open flaws 4 therein. Where an open flaw 4 exists, the position and the width of the opening are determined.

Next, as a first step, build-up weld layers 5 are formed in the welding heat-affected portion 3, in which the open flaw 4 occurs, by means of repair welding. Build-up weld layers 5 are formed by irradiating the surface with a laser beam 7 while welding wire 6 is supplied. The weld layers 5 seal the open flaw 4. A processing head 11 used in this embodiment may be the same as that previously described in the first embodiment.

When this repair method is applied to a structure in a nuclear reactor where there is a possibility that the base material has deteriorated due to neutron irradiation, weld flaws may occur due to the heat input during a repair welding operation. To avoid such weld flaws, the heat input rate is preferably set between 0.1 kJ/cm and 5 kJ/cm. Furthermore, to avoid trapping water in an open portion of the open flaw 4 is sealed with the build-up weld layers 5, ultrasonic vibrations are generated in nozzle 24 of a processing head 11. Generating ultrasonic vibrations in nozzle 24 atomizes water in the interior of the open flaw 4, causing the water to be discharged from the open flaw 4.

As second step in this method, a residual stress-reduced layer 10 is formed by reducing the residual stress in a surface portion of the build-up weld layers 5 by means of laser peening or shot blasting. In the laser peening operation, the surface portions of the build-up weld layers 5 are heated momentarily, i.e., for periods of time of 5 to 100 nanoseconds, by the irradiation of a laser beam, thereby plastically deforming the surface portions. Thus, the tensile residual stress in the surface portions of the buildup weld layers 5 is reduced. In the shot blasting operation, the plastic deformation of the surface portions is induced by shooting steel balls of 0.1 to 5 millimeters in diameter at the surface portion including the build-up weld layers 5. The induced plastic deformation reduces the tensile residual stress in the surface portions of the build-up weld layers 5. Instead of, or in addition to the laser peening or the shot blasting, it is also possible to reduce the tensile residual stress by means of water jet machining for spraying high-speed water to the surface portion.

Repair welding process and residual stress reducing process described above will prevent cracking from occurring, and prevent recurring cracking, such as stress corrosion cracking, even in deteriorated structure, and thereby prolong the lifetime of the repaired weld portion, and thus the structure as a whole.

In the first embodiment, a bevel build-up method for executing a build-up repair welding operation after making a bevel (concave portion) so as to remove a crack, is described, and in the second embodiment, a crack sealing method for sealing an open portion only of a surface of a structure without removing a crack from a structure.

In any of these methods, it is indispensable to remove crud or an oxide film before welding an open flaw, however, in carrying out a bevel padding operation, crud as well as an oxide film is removed when a bevel is formed. Thus, in case of build-up repair along a whole weld line, irrespective of the presence or absence of cracking, the cleaning operation is not needed. On the other hand, when the presence or absence of cracking is examined and ascertained is carried out before a build-up welding operation, it is preferable to perform a cleaning operation according to the above-mentioned pretreatment step before the examination.

According to a repair method for structures and a repair welding apparatus for a structure of the present invention, it is possible to remove a crack occurring in a structure, or seal the portion of a crack which is at the surface of a region to be repair welded, and then reduce the tensile residual stress in the surface portion of the repaired weld portion, and thereby inhibit the recurrence of a crack.

What is claimed is:

1. A repair method for a structure having an open flaw in a welding heat-affected portion, comprising:
   removing at least a part of the open flaw and thereby forming a concave portion in the welding heat affected portion;
   forming build-up weld layers so as to fill the concave portion; and
   treating a surface of the build-up weld layers to reduce tensile residual stress by means of at least one of laser peening, shot blasting and water jet machining.

2. The repair method as recited in claim 1, further comprising:
   prior to the forming of the concave portion, cleaning a surface of the welding heat affected portion.

3. A repair method for a structure having an open flaw in a welding heat-affected portion, comprising:
   cleaning a surface of the welding heat-affected portion,
   forming build-up weld layers on a region including the open flaw to seal the open flaw therewith; and
   treating a surface of the build-up weld layers to reduce tensile residual stress by means of at least one of laser peening, shot blasting and water jet machining.

4. The repair method as recited in claim 1, wherein, when a part of an open flaw remains on the concave portion after the forming of the concave portion, in the forming of the build-up weld layers, the remained open flaw is sealed with an initial build-up weld layer.

5. The repair method as recited in claim 1, wherein the forming of the build-up weld layers is carried out by one of irradiating a laser beam as a welding wire is supplied and arc welding as a welding wire is supplied.

6. The repair method as recited in claim 1, wherein when forming build-up weld layers, a welding heat input is between 0.1 kJ/cm and 5 kJ/cm.

7. The repair method as recited in claim 2, wherein the cleaning is accomplished by at least one of irradiation of a laser beam, grinder machining, and flap wheel machining.

8. The repair method as recited in claim 1, wherein the forming of the concave portion is accomplished by one of mechanical grinding and electric discharge machining.

9. The repair method as recited in claim 1, wherein the concave portion is substantially trapezoidal in cross-section.

10. The repair method as recited in claim 3, wherein when forming build-up weld layers, an open flaw in the welding heat-affected portion is sealed with an initial build-up weld layer.

11. The repair method as recited in claim 3, wherein the forming of the build-up weld layers is carried out by one of irradiating a laser beam as a welding wire is supplied or arc welding as a welding wire is supplied.

12. The repair method as recited in claim 3, wherein when forming build-up layers, a welding heat input is between 0.1 kJ/cm and 5 kJ/cm.

13. The repair method as recited in claim 3, wherein the cleaning is accomplished by at least one of irradiation of a laser beam, grinder processing, and flap wheel processing.

14. The repair method as recited in claim 4, wherein forming an initial build-up weld layer is carried out while removing water in the open flaw.

15. The repair method as recited in claim 10, wherein the forming of the initial build-up weld layer is carried out while removing water in the open flaw.

* * * * *